(12) United States Patent
Hou et al.

(10) Patent No.: US 9,097,579 B2
(45) Date of Patent: Aug. 4, 2015

(54) ELECTRICAL CALIBRATED RADIOMETER

(75) Inventors: Kuan-Chou Hou, Hsinchu (TW); Mang Ou-Yang, Tainan (TW); Jin-Chern Chiou, Hsinchu (TW)

(73) Assignee: NATIONAL CHIAO TUNG UNIVERSITY, Hsinshu (TW)

( * ) Notice: Subject to any disclaimer, the term of this patent is extended or adjusted under 35 U.S.C. 154(b) by 366 days.

(21) Appl. No.: 13/556,358

(22) Filed: Jul. 24, 2012

(65) Prior Publication Data

US 2013/0032719 A1 Feb. 7, 2013

(30) Foreign Application Priority Data

Aug. 3, 2011 (TW) .............................. 100127588 A

(51) Int. Cl.
*G01J 5/20* (2006.01)
*G01J 5/10* (2006.01)
*G01J 5/06* (2006.01)

(52) U.S. Cl.
CPC .............. *G01J 5/10* (2013.01); *G01J 2005/068* (2013.01)

(58) Field of Classification Search
CPC ................. G01J 5/20; G01J 5/24; G01J 5/34; G01J 2005/067; G01J 2005/068
USPC ................. 250/338.4, 338.3, 339.02, 339.03, 250/341.1, 352
See application file for complete search history.

(56) References Cited

U.S. PATENT DOCUMENTS

| | | | | |
|---|---|---|---|---|
| 5,450,053 | A * | 9/1995 | Wood | 338/18 |
| 5,600,174 | A * | 2/1997 | Reay et al. | 257/467 |
| 5,777,328 | A * | 7/1998 | Gooch | 250/338.4 |
| 5,912,464 | A * | 6/1999 | Vilain et al. | 250/338.4 |
| 6,316,770 | B1 * | 11/2001 | Ouvrier-Buffet et al. | 250/338.1 |
| 6,891,503 | B1 * | 5/2005 | Savry et al. | 343/700 MS |
| 7,005,644 | B2 * | 2/2006 | Ishikawa et al. | 250/339.04 |
| 2001/0025926 | A1* | 10/2001 | Mashio et al. | 250/338.4 |
| 2001/0035559 | A1* | 11/2001 | Ando et al. | 257/443 |
| 2002/0139933 | A1* | 10/2002 | Iida et al. | 250/338.1 |
| 2002/0166968 | A1* | 11/2002 | Bradley | 250/338.1 |
| 2004/0140429 | A1* | 7/2004 | Jack et al. | 250/338.1 |
| 2005/0178967 | A1* | 8/2005 | Nakaki et al. | 250/339.04 |
| 2008/0304544 | A1* | 12/2008 | Kvisteroy et al. | 374/143 |
| 2011/0180711 | A1* | 7/2011 | Tsuchiya | 250/338.4 |
| 2011/0248374 | A1* | 10/2011 | Akin et al. | 257/470 |

* cited by examiner

*Primary Examiner* — David Porta
*Assistant Examiner* — Djura Malevic
(74) *Attorney, Agent, or Firm* — Nixon & Vanderhye P.C.

(57) ABSTRACT

An electrical calibrated radiometer includes a base, a suspension unit extending from the base, and a first heat measuring unit and a second heat measuring unit formed in the base. By applying a known voltage to the first heat measuring unit, the first heat measuring unit could serve as a thermal background for the second heat measuring unit, and an absolute temperature of a heat source could be determined with high precision from output voltages of the second heat measuring unit.

10 Claims, 4 Drawing Sheets

ELECTRICAL CALIBRATED RADIOMETER

CROSS-REFERENCE TO RELATED APPLICATION

This application claims priority to Taiwanese Application No. 100127588, filed on Aug. 3, 2011.

BACKGROUND OF THE INVENTION

1. Field of the Invention

The invention relates to a thermometer, and more particularly to a thermal radiometer that detects thermal radiation.

2. Description of the Related Art

Thermal radiometer is a device used to determine the temperature of a heat source after receiving heat radiated by the heat source. There are a variety of applications, from thermal imaging systems (infrared thermal imaging systems, night vision scope, physiological examinations) to celestial observation, etc. All of these applications require the thermal radiometer to have high absorption and high sensitivity.

FIG. 1 shows a conventional thermal radiometer 1 that includes a base 11, and a heat measuring unit 12 disposed on the base 11. The heat measuring unit 12 includes a thermal layer 121 made of thermo-sensitive material and formed on the base 11, and two signal arms 122 extending respectively from two end portions of the thermal layer 121, wherein the two signal arms 122 are provided for signal input and signal output, respectively. When measuring, an initial input voltage is inputted into one of the two signal arms 122, and an initial output voltage corresponding to the initial input voltage can be measured from the other one of the two signal arms 122. When the thermal layer 121 receives the heat radiated by the heat source, the resistance value thereof changes, and a sense output voltage can be measured from the changes in output voltage of the other one of the two signal arms 122. The sense output voltage is then, for example, amplified or converted to determine the temperature of the heat source.

As the thermal radiometer 1 described above has the base 11 being in direct contact with the thermal layer 121, heat conduction will influence the sensitivity of the thermal radiometer 1. There are some references directed to improving the sensitivity of the thermal radiometer. For example, Taiwanese Patent Number 514723 (Micro-bridge Structure for a Bolometer, Method of Fabricating the Same onto a Substrate and Transducer) and Taiwanese Patent Number 561249 (High-absorption wide-band pixel for bolometer arrays) suggest respective technical schemes of micro-bridge structure and platform body suspended by supporting arm, in which the base is not in direct contact with the thermal layer to lower thermal conduction and thus improve the sensitivity of the thermal radiometer.

Although the technical schemes such as the micro-bridge structure or the platform body suspended by the supporting arm offer some improvement on the problem of thermal conduction between the base and the thermal layer that influences the sensitivity of the thermal radiometer, the thermal layer is still affected by heat coming from the environment when receiving the radiated heat of the heat source, which means the heat detected by the thermal radiometer is relative to the environmental temperature. Therefore, although the conventional thermal radiometer may have higher sensitivity, the accuracy of the temperature detected for the heat source still needs improvement for higher precision applications.

SUMMARY OF THE INVENTION

Therefore, an object of the present invention is to provide an electrical calibrated radiometer able to receive an auxiliary electrical energy for producing a thermal background to reduce the influence of heat from the environment.

The electrical calibrated radiometer of the present invention includes a base, a suspension unit, a first heat measuring unit and a second heat measuring unit.

The base has a top surface formed with a groove.

The suspension unit includes a support part extending from the top surface of the base, and a plate-shaped suspended part extending from one end of the support part that is opposite to the base. The suspended part extends above the groove and is free of contact with the base.

The first heat measuring unit includes a first thermal layer made of thermo-sensitive material and formed in the suspended part, and two first signal arms extending respectively from two end portions of the first thermal layer, wherein the first signal arms are provided for signal input and signal output, respectively.

The second heat measuring unit includes a second thermal layer made of thermo-sensitive material, formed in the suspended part and spaced apart from the first thermal layer, and two second signal arms extending respectively from two end portions of the second thermal layer, wherein the second signal arms are provided for signal input and signal output, respectively.

Preferably, a projection of the first heat measuring unit onto the top surface of the base overlaps a projection of the second heat measuring unit onto the top surface of the base.

Preferably, one of the first and second thermal layers is disposed above the other one of the first and second thermal layers.

Preferably, each of the first and second thermal layers has a serpentine form.

Preferably, the first signal arms are disposed at opposite sides with respect to the groove, and the second signal arms are disposed at opposite sides with respect to the groove.

Preferably, the electrical calibrated radiometer further comprises a bridge rectifier circuit electrically coupled to one of the second signal arms of the second heat measuring unit, a voltage amplifier electrically coupled to the bridge rectifier circuit, and a lock-in amplifier electrically coupled to the voltage amplifier.

Preferably, the first and second thermal layers are made of the same thermo-sensitive material selected from the group consisting of platinum, polycrystalline silicon, vanadium, and combinations thereof.

Preferably, the suspended part is made of a material selected from the group consisting of silicon dioxide, silicon nitride, and a combination thereof.

Preferably, each of the first thermal layer and the second thermal layer has a thickness ranging from 100 nm to 5000 nm, and a distance between the first thermal layer and the second thermal layer ranges from 100 nm to 3000 nm.

Preferably, each of the first and second thermal layers has an area ranging from 2000 $\mu m^2$ to 10000 $\mu m^2$.

By applying a known voltage to the first thermal layer, the first thermal layer could serve as a thermal background for the second thermal layer, and an absolute thermal energy of a heat source could be determined with high precision from output voltages of the second thermal layer.

BRIEF DESCRIPTION OF THE DRAWINGS

Other features and advantages of the present invention will become apparent in the following detailed description of the preferred embodiments with reference to the accompanying drawings.

DETAILED DESCRIPTION OF THE PREFERRED EMBODIMENTS

Figure 1:
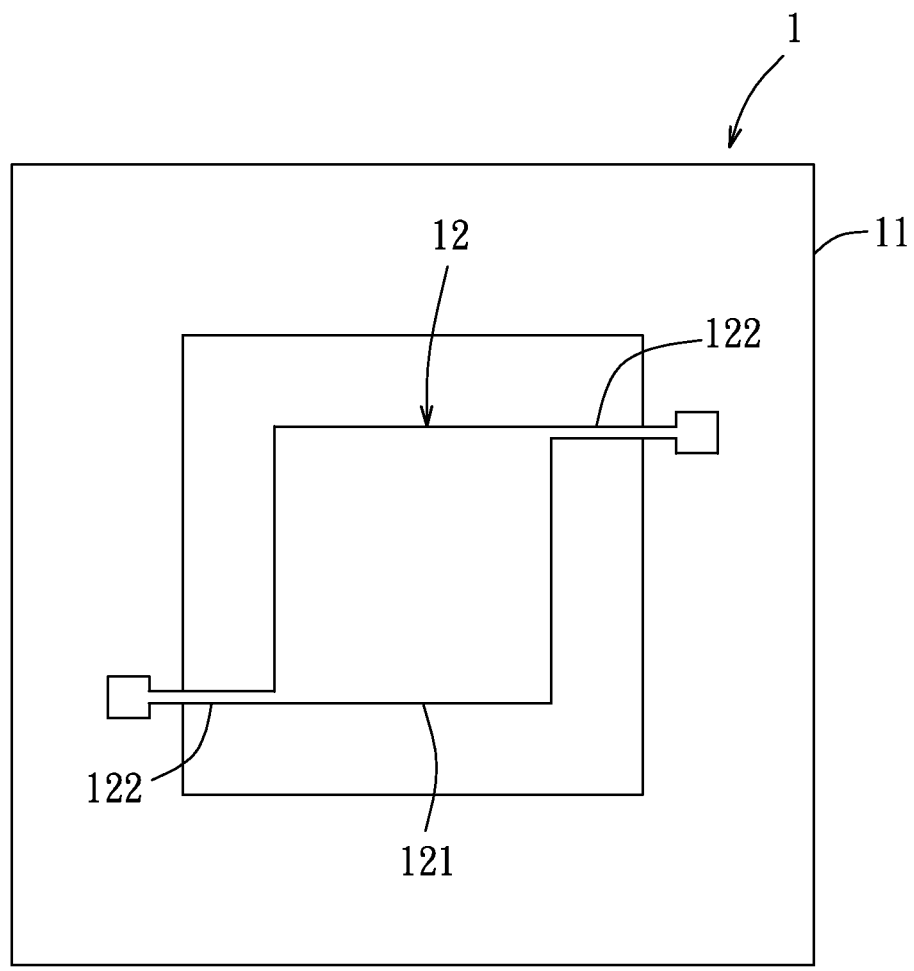
FIG. 1 illustrates a conventional thermal radiometer.
Figure 2:
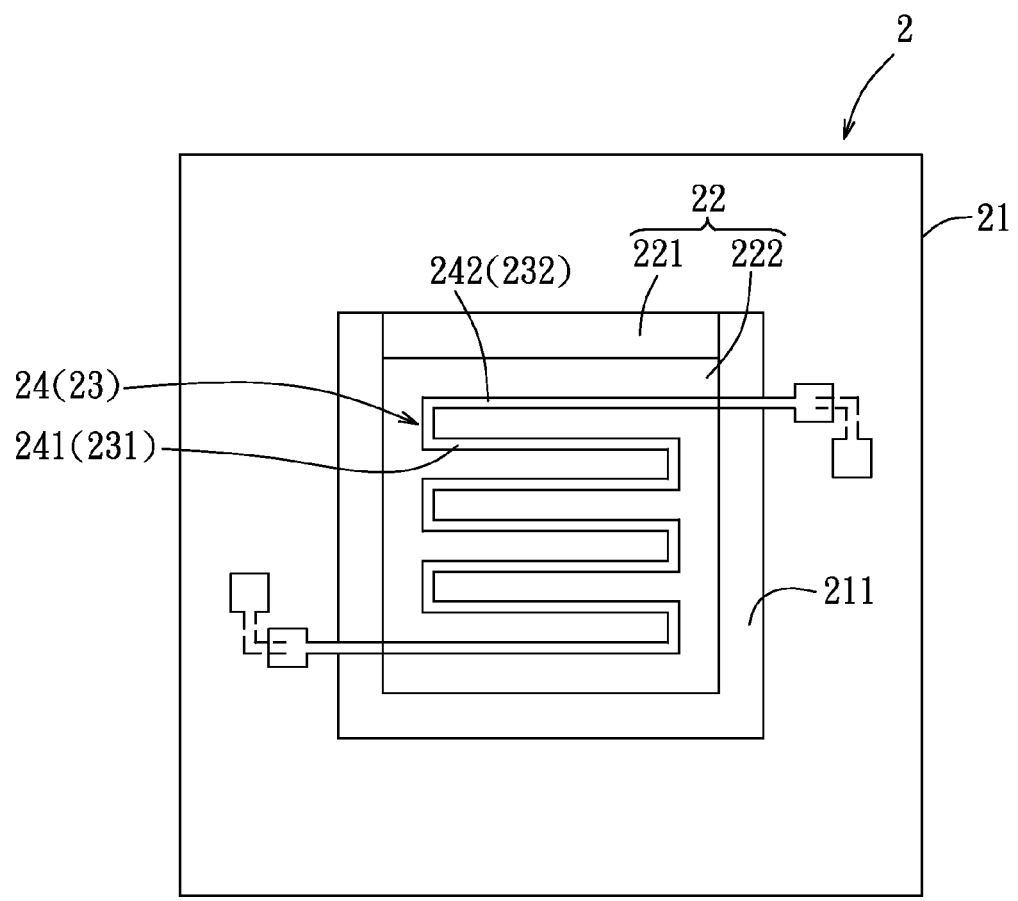
FIG. 2 illustrates a top schematic view of a preferred embodiment of the electrical calibrated radiometer of the present invention.
Figure 3:
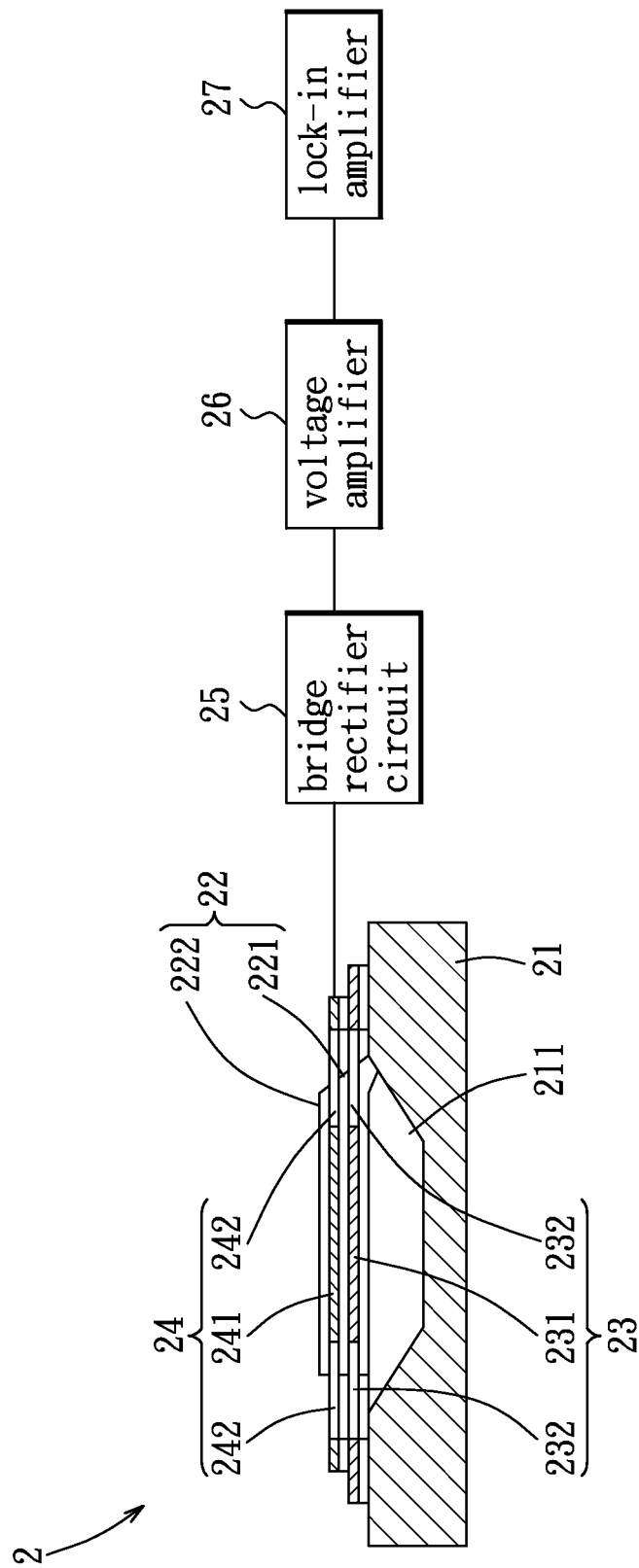
FIG. 3 is a schematic diagram of the preferred embodiment of the electrical calibrated radiometer of the present invention.

FIGS. 2 and 3 show a preferred embodiment of the electrical calibrated radiometer 2 of the present invention. The electrical calibrated radiometer 2 includes a base 21, a suspension unit 22, a first heat measuring unit 23, a second heat measuring unit 24, and a bridge rectifier circuit 25, a voltage amplifier 26, and a lock-in amplifier disposed outwardly relative to the second heat measuring unit 24. The electrical calibrated radiometer 2 is used to receive heat radiated by a heat source and convert the received heat to obtain the actual absolute thermal energy of the heat source, wherein the actual absolute thermal energy represents the temperature value of the heat source with influence of the environment reduced to a minimum.

The base 21 has a top surface formed with a groove 211. In this embodiment, the base 21 is a silicon substrate with the groove 211 formed using micro-electromechanical technology.

The suspension unit 22 includes a support part 221 extending from the top surface of the base 21, and a plate-shaped suspended part 222 extending from one end of the support part 221 that is opposite to the base 21. The suspended part 222 extends above the groove 211 and is free of contact with the base 21. In this embodiment, the suspension unit 22 is made of silicon dioxide, and the plate-shaped suspended part 222 has a thickness of 3 µm.

The first heat measuring unit 23 includes a first thermal layer 231 made of thermo-sensitive material and formed in the suspended part 222, and two first signal arms 232 extending respectively from two end portions of the first thermal layer 231, wherein the first signal arms 232 are provided for signal input and signal output, respectively. In this embodiment, the first heat measuring unit 23 is made of platinum and has a serpentine form with a thickness of 300 µm.

The second heat measuring unit 24 includes a second thermal layer 241 made of thermo-sensitive material, formed in the suspended part 222 and spaced apart from the first thermal layer 231, and two second signal arms 242 extending respectively from two end portions of the second thermal layer 241, wherein the second signal arms 242 are provided for signal input and signal output, respectively. In this embodiment, the second heat measuring unit 24 is also made of platinum and has a serpentine form with a thickness of 300 µm, the distance between the first and second thermal layers 231, 241 is 1 µm, and a projection of the first heat measuring unit 23 onto the top surface of the base 21 overlaps a projection of the second heat measuring unit 24 onto the top surface of the base 21. Moreover, in this embodiment, the second thermal layer 241 is disposed above the first thermal layer 231, the first signal arms 232 are disposed at opposite sides with respect to the groove 211, and the second signal arms 242 are disposed at opposite sides with respect to the groove 211.

The bridge rectifier circuit 25 is electrically coupled to one of the second signal arms 242 of the second heat measuring unit 24. The voltage amplifier 26 is electrically coupled to the bridge rectifier circuit 25. The lock-in amplifier 27 is electrically coupled to the voltage amplifier 26. In other words, the bridge rectifier circuit 25, the voltage amplifier 26 and the lock-in amplifier 27 are connected in series. As the bridge rectifier circuit 25, the voltage amplifier 26, and the lock-in amplifier 27 are common electronic components, they are not described in detail herein for the sake of brevity.

The above-mentioned preferred embodiment of the electrical calibrated radiometer 2 of the present invention is fabricated using micro-electromechanical technology. A silicon substrate initially undergoes RCA cleaning. The silicon substrate is then placed in a furnace tube to grow a silicon dioxide layer that is 1 µm in thickness. Platinum is deposited on the silicon dioxide layer to form a thin layer 300 nm thick. After exposing, developing and etching, etc., the first heat measuring unit 23 is formed. PECVD is used to deposit on first heat measuring unit 23 another layer of silicon dioxide 1 µm in thickness. Platinum is deposited on the silicon dioxide layer to form another thin layer 300 nm thick. After exposing, developing and etching, etc., the second heat measuring unit 24 is formed. PECVD is used to deposit on the second heat measuring unit 24 another layer of silicon dioxide 1 µm in thickness. Finally, photoresist agent is used to define the size of the opening of the silicon dioxide layers, and by using dry and wet etching on the silicon substrate, the groove 211 corresponding to the first and second thermal layers 231, 241 of the first and second heat measuring units 23, 24 is obtained, thus completing the manufacturing process.

Figure 4:
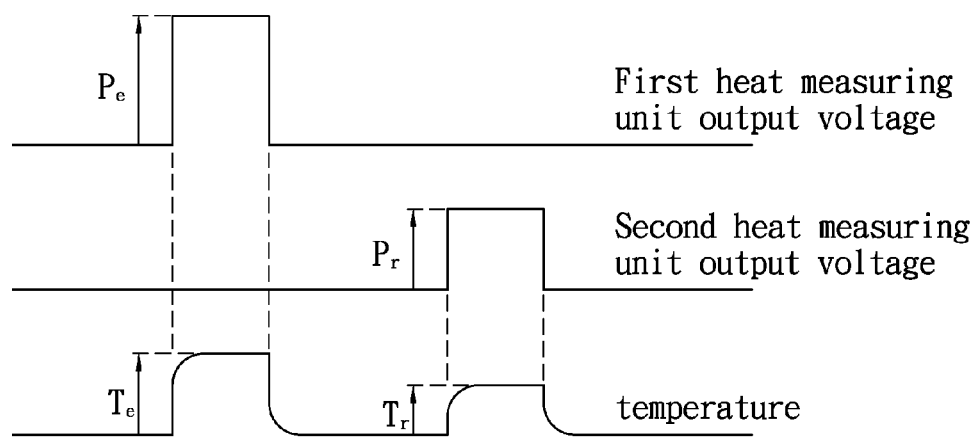
FIG. 4 is a plot showing the relation of output voltages of a heat measuring unit and a second heat measuring unit to temperature.

FIG. 4 is a plot showing the relation of output voltages of the first heat measuring unit 23 and the second heat measuring unit 24 to temperature. An initial input voltage of a unit of time is input to one of the first signal arms 232 of the first heat measuring unit 23, and the first thermal layer 231 heats up due to the initial input voltage. Therefore, by the relationship of the input voltage, input unit of time, and the change of resistance value of the first thermal layer 231, the input energy (the peak labelled Pe in FIG. 4) can be calculated. The background environment temperature, labelled Te, is the result of heat of the first thermal layer 231 being transmitted to the second thermal layer 241, causing a change in temperature of the second thermal layer 241, and because of the input energy (Pe), the resistance value of the second thermal layer 241 changes for the first time. After stopping input of the initial input voltage, the resistance value of the second thermal layer 241 of the second heat measuring unit 24 will change for a second time in response to receipt of a unit of time of heat radiated by a heat source (the peak labelled Pr in FIG. 4). The temperature of the second thermal layer 241 changes in response to the radiated heat Pr, and is the peak labelled Tr in FIG. 4. The bridge rectifier circuit 25 converts the resistance changes in the second thermal layer 241 into voltage signals, the voltage amplifier 26 then amplifies the voltage signals resulting from the first and second resistance changes in the second thermal layer 241, and after the lock-in amplifier 27 eliminates noise, signal processing is used to obtain the difference between the voltage signals resulting from the first and second resistance changes, from which Pr may be obtained. As Pe is a known auxiliary electrical energy, and Te, Tr can be represented by the corresponding resistance changes, the radiated heat of the heat source can be calculated from the relationship of Pr to the resistance changes. Since the theoretical formula of Pr, Pe, Te, Tr and the theoretical formula of Te, Tr and the resistance changes are not the focus of the invention, they are not further described herein. At the start of measurement, an initial input voltage is inputted to have the first thermal layer 231 heat up, so that the first thermal layer 231 can serve as a thermal background for the second thermal layer 241. Hence, when the second thermal layer 241 receives heat radiated by the heat source, the influence of the environmental temperature is minimized to obtain the actual absolute temperature of the heat source.

It is also worth noting that the material used for the first and second thermal layers 231, 241 of the first and second heat measuring units 23, 24 is not restricted to platinum, and the thermo-sensitive material can be selected from platinum, polycrystalline silicon, vanadium, and combinations thereof. To be compatible with the micro-electromechanical technology, the material used for the suspension unit 22 is not restricted to silicon dioxide, and may be silicon nitride. By configuring each of the first thermal layer 231 and the second thermal layer 241 of the first and second heat measuring units 23, 24 to have the thickness ranging from 100 nm to 5000 nm, and a distance between the first thermal layer 231 and the second thermal layer 241 to range from 100 nm to 3000 nm, and by configuring each of the first and second thermal layers 231, 241 to have an area ranging from 2000 $\mu m^2$ to 10000 $\mu m^2$, the influence of environmental temperature is effectively minimized to increase the accuracy when measuring. Moreover, although the preferred embodiment uses the first heat measuring unit 23 as the thermal background for the second heat measuring unit 24, in actual applications, the accuracy is not affected if their roles are interchanged.

As described above, by applying a known voltage to the first thermal layer 231, the first thermal layer 231 could serve as a thermal background for the second thermal layer 241, and an absolute temperature of a heat source could be determined with high precision from output voltages of the second thermal layer 241.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electrical calibrated radiometer comprising:
    a base having a top surface formed with a groove;
    a suspension unit including a support part extending from said top surface of said base, and a plate-shaped suspended part extending from one end of said support part that is opposite to said base, said suspended part extending above said groove and being free of contact with said base;
    a first heat measuring unit including a first thermal layer made of thermo-sensitive material and being formed only in said suspended part, and two first signal arms extending respectively from two end portions of said first thermal layer, wherein said first signal arms are provided for signal input and signal output, respectively; and
    a second heat measuring unit including a second thermal layer made of thermo-sensitive material and being formed only in said suspended part and spaced apart from said first thermal layer, and two second signal arms extending respectively from two end portions of said second thermal layer, wherein said second signal arms are provided for signal input and signal output, respectively.

2. The electrical calibrated radiometer as claimed in claim 1, wherein a projection of said first heat measuring unit onto said top surface of said base overlaps a projection of said second heat measuring unit onto said top surface of said base.

3. The electrical calibrated radiometer as claimed in claim 1, wherein one of said first and second thermal layers is disposed above the other one of said first and second thermal layers.

4. The electrical calibrated radiometer as claimed in claim 1, wherein each of said first and second thermal layers has a serpentine form.

5. The electrical calibrated radiometer as claimed in claim 1, wherein said first signal arms are disposed at opposite sides with respect to said groove, and said second signal arms are disposed at opposite sides with respect to said groove.

6. The electrical calibrated radiometer as claimed in claim 1, further comprising:
    a bridge rectifier circuit electrically coupled to one of said second signal arms of said second heat measuring unit;
    a voltage amplifier electrically coupled to said bridge rectifier circuit; and
    a lock-in amplifier electrically coupled to said voltage amplifier.

7. The electrical calibrated radiometer as claimed in claim 1, wherein said first and second thermal layers are made of the same thermo-sensitive material selected from the group consisting of platinum, polycrystalline silicon, vanadium, and combinations thereof.

8. The electrical calibrated radiometer as claimed in claim 1, wherein said suspended part is made of a material selected from the group consisting of silicon dioxide, silicon nitride, and a combination thereof.

9. The electrical calibrated radiometer as claimed in claim 1, wherein each of said first thermal layer and said second thermal layer has a thickness ranging from 100 nm to 5000 nm, and a distance between said first thermal layer and said second thermal layer ranges from 100 nm to 3000 nm.

10. The electrical calibrated radiometer as claimed in claim 9, wherein each of said first and second thermal layers has an area ranging from 2000 $\mu m^2$ to 10000 $\mu m^2$.

* * * * *